US011898732B2

(12) United States Patent
Sun et al.

(10) Patent No.: US 11,898,732 B2
(45) Date of Patent: Feb. 13, 2024

(54) LIGHTING FIXTURE

(71) Applicants: SUZHOU OPPLE LIGHTING CO., LTD., Suzhou (CN); OPPLE LIGHTING CO., LTD., Shanghai (CN)

(72) Inventors: Yinglong Sun, Suzhou (CN); Yu Mao, Suzhou (CN)

(73) Assignees: Suzhou Opple Lighting Co., Ltd., Suzhou (CN); Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 18/077,991

(22) Filed: Dec. 8, 2022

(65) Prior Publication Data

US 2023/0107994 A1 Apr. 6, 2023

Related U.S. Application Data

(63) Continuation of application No. PCT/CN2021/097926, filed on Jun. 2, 2021.

(30) Foreign Application Priority Data

Jun. 24, 2020 (CN) ......................... 202021210620.5

(51) Int. Cl.
*F21V 21/35* (2006.01)
*F21V 21/10* (2006.01)
(Continued)

(52) U.S. Cl.
CPC .............. *F21V 21/35* (2013.01); *F21V 21/10* (2013.01); *F21V 21/14* (2013.01); *F21V 23/003* (2013.01)

(58) Field of Classification Search
CPC .......... F21V 21/35; F21V 21/10; F21V 21/14; F21V 23/003
See application file for complete search history.

(56) References Cited

U.S. PATENT DOCUMENTS 4,118,760 A * 10/1978 Cohon .................... F21S 8/033 362/258
4,475,226 A * 10/1984 Greenberg ............... H04R 3/12 362/370

(Continued)

FOREIGN PATENT DOCUMENTS

CN 201787429 U 4/2011
CN 204629223 U 9/2015

(Continued)

OTHER PUBLICATIONS

International Search Report of PCT Application No. PCT/CN2021/097926 dated Sep. 1, 2021 with English translation, (4p).

*Primary Examiner* — Bryon T Gyllstrom
(74) *Attorney, Agent, or Firm* — Arch & Lake LLP

(57) ABSTRACT

The present disclosure discloses a lighting fixture, including: a base, where the base is provided with a driving power supply; a lighting column, where the lighting column includes a column body and a conductive track, one end of the column body is installed on the base, the column body is provided with a sunk groove extending along a length direction of the column body, the conductive track is installed in the sunk groove, and the conductive track is electrically connected with the driving power supply; a sliding assembly, where the sliding assembly includes a sliding body and a conductive portion; and a lighting cap assembly, wherein the lighting cap assembly includes a housing and a light source, the light source is installed in the housing, the housing is connected with the sliding body, and the light source is connected with the conductive portion.

20 Claims, 5 Drawing Sheets

(51) Int. Cl.
*F21V 21/14* (2006.01)
*F21V 23/00* (2015.01)

(56) References Cited

U.S. PATENT DOCUMENTS

| | | | | |
|---|---|---|---|---|
| 11,098,884 | B2 * | 8/2021 | Machate | F21V 21/35 |
| 11,287,122 | B1 * | 3/2022 | Hendler | H01R 25/14 |
| 2006/0012977 | A1 * | 1/2006 | Joseph | F21V 21/35<br>362/147 |
| 2020/0146492 | A1 * | 5/2020 | Loomis | H05B 47/155 |
| 2021/0143590 | A1 * | 5/2021 | Rafferty | H01R 33/74 |
| 2022/0120391 | A1 * | 4/2022 | Plissey | F21V 23/001 |

FOREIGN PATENT DOCUMENTS

| | | | |
|---|---|---|---|
| CN | 207674171 | U | 7/2018 |
| CN | 209431361 | U | 9/2019 |
| CN | 111720764 | A | 9/2020 |
| CN | 212056821 | U | 12/2020 |

* cited by examiner

LIGHTING FIXTURE

CROSS-REFERENCE TO RELATED APPLICATIONS

This application is based upon and claims the priority of PCT patent application No. PCT/CN2021/097926 filed on Jun. 2, 2021 which claims priority to the Chinese patent application No. 202021210620.5 filed on Jun. 24, 2020, the entire contents of which are hereby incorporated by reference herein for all purposes.

TECHNICAL FIELD

The present disclosure relates to the technical field of lighting facilities, in particular to a lighting fixture.

BACKGROUND

Lighting fixture is an important tool in people's production and life. The lighting fixture is usually fixed on the wall, roof or ground.

SUMMARY

The present disclosure discloses a lighting fixture.

According to the present disclosure, the present disclosure provides a lighting fixture. The lighting fixture may include:

- a base, where the base is provided with a driving power supply;
- a lighting column, where the lighting column includes a column body and a conductive track, one end of the column body is installed on the base, the column body is provided with a sunk groove extending along a length direction of the column body, the conductive track is installed in the sunk groove, and the conductive track is electrically connected with the driving power supply;
- a sliding assembly, where the sliding assembly includes a sliding body and a conductive portion, the conductive portion is connected with the sliding body, the sliding body can slide along the column body, and the conductive portion is electrically connected with the conductive track; and
- a lighting cap assembly, where the lighting cap assembly includes a housing and a light source, the light source is installed in the housing, the housing is connected with the sliding body, and the light source is connected with the conductive portion.

It is to be understood that the foregoing general description and the following detailed description are exemplary and explanatory only and are not restrictive of the disclosure.

BRIEF DESCRIPTION OF THE DRAWINGS

The accompanying drawings described here are used for further understanding of the present disclosure and constitute one part of the present disclosure. Schematic examples of the present disclosure and the description thereof are used to explain the present disclosure, and do not constitute an improper limitation to the present disclosure. In the drawings.

DETAILED DESCRIPTION

In order to make objects, technical solutions and advantages of the present disclosure more apparent, the technical solutions of the present disclosure will be described in a clear and complete way in connection with the examples of the present disclosure and corresponding drawings. Apparently, the described examples are just a part but not all of the examples of the present disclosure. Based on the described examples herein, all other example(s) obtained by those ordinary skilled in the art without any inventive work should be within the scope of the present disclosure.

Reference numbers used in this disclosure may include:

100—lighting column, 110—column body, 111—limiting hole, 120—conductive track, 130—insulating end cap, 131—installation hole, 140—limiting post, 150—screw, 160—electrical connector,

200—sliding assembly, 210—sliding body, 211—through-hole, 212—positioning hole, 220—conductive portion, 230—positioning portion, 240—damping sleeve,

300—lighting cap assembly, 310—housing, 320—light source, 330—gland, 340—light distribution lens, 350—soft supporting arm,

400—base, 410—installation portion, 411—cover, 412—adapter plate, 413—base body, 420—supporting rod, 421—supporting section, 422—connecting elbow, 430—bottom box.

When the lighting fixture is fixed on the wall, roof or ground, the position of lighting fixture may not be easy to adjusted, which may be inconvenient for users to use.

Figure 1:
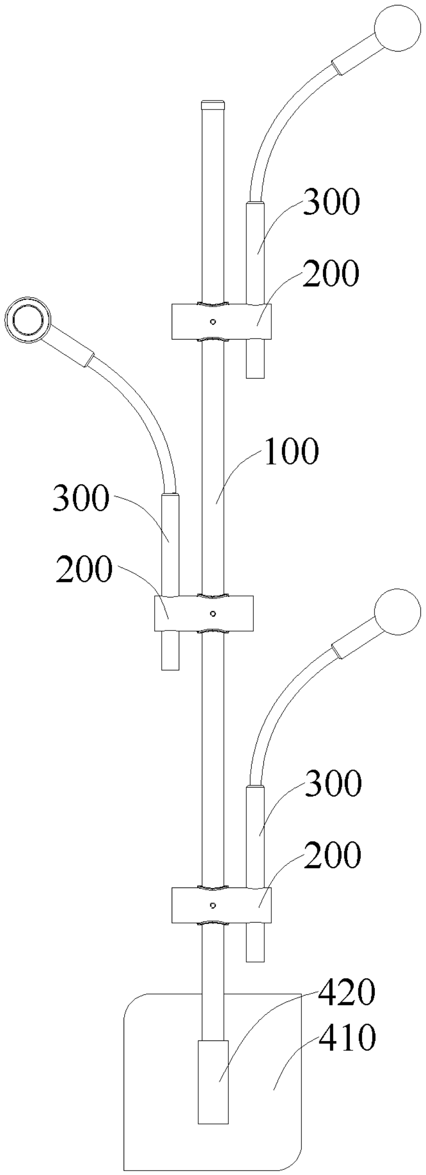
FIG. 1 is a schematic structural diagram of a lighting fixture according to an example of the present disclosure.
Figure 2:
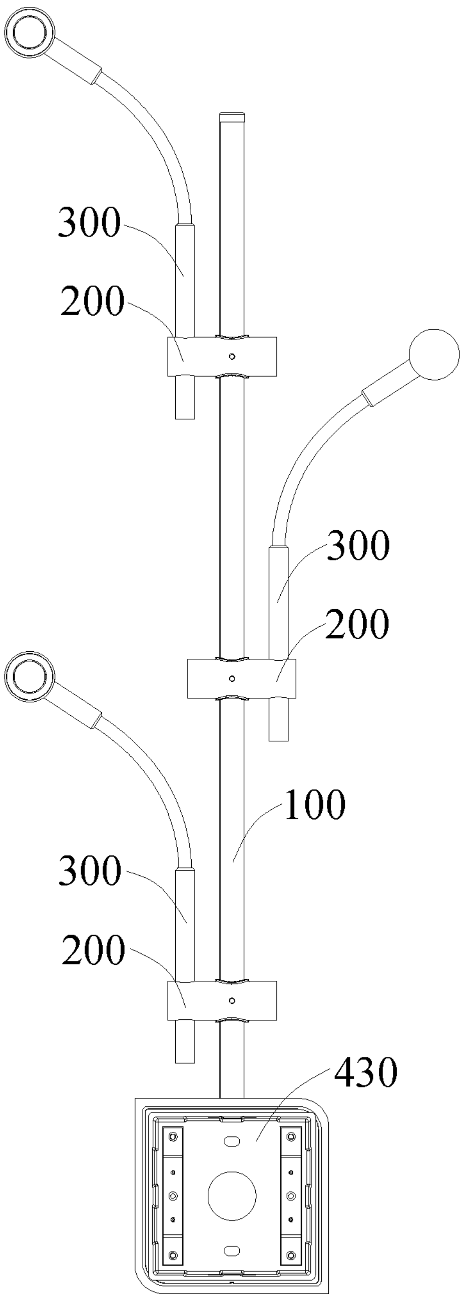
FIG. 2 is a schematic structural diagram of a lighting fixture according to an example of the present disclosure in another direction.
Figure 3:
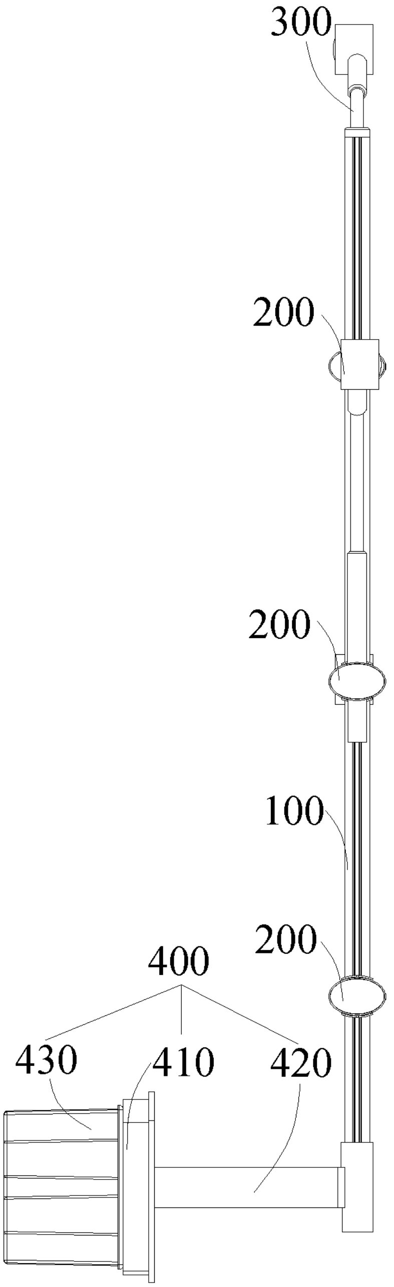
FIG. 3 is a schematic structural diagram of a lighting fixture according to an example of the present disclosure in further another direction.
Figure 4:
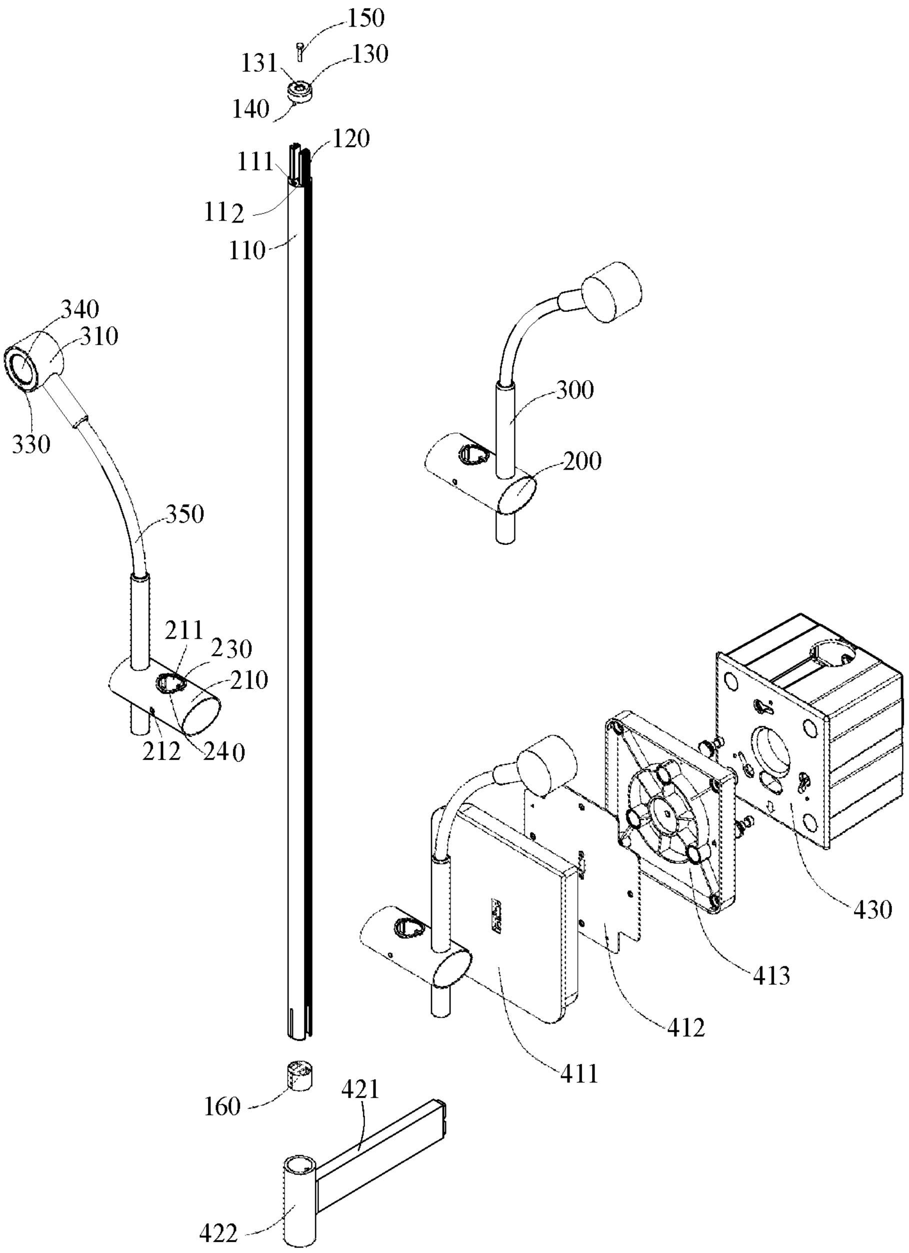
FIG. 4 is an exploded schematic diagram of a lighting fixture according to an example of the present disclosure.
Figure 5:
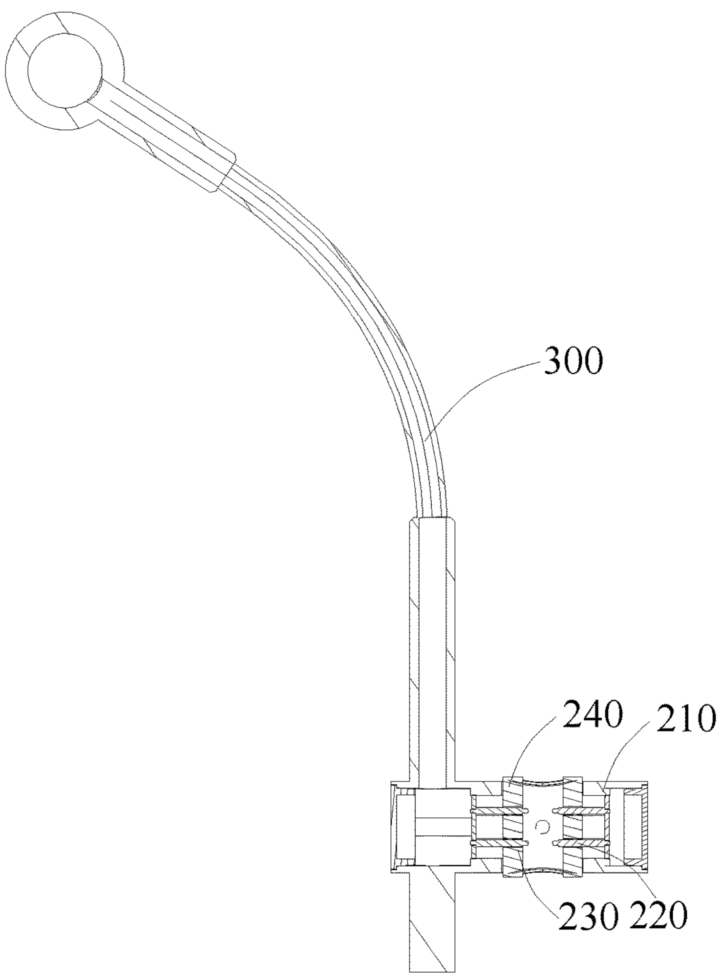
FIG. 5 is a schematic cross-sectional view of a sliding assembly in a lighting fixture according to an example of the present disclosure.
Figure 6:
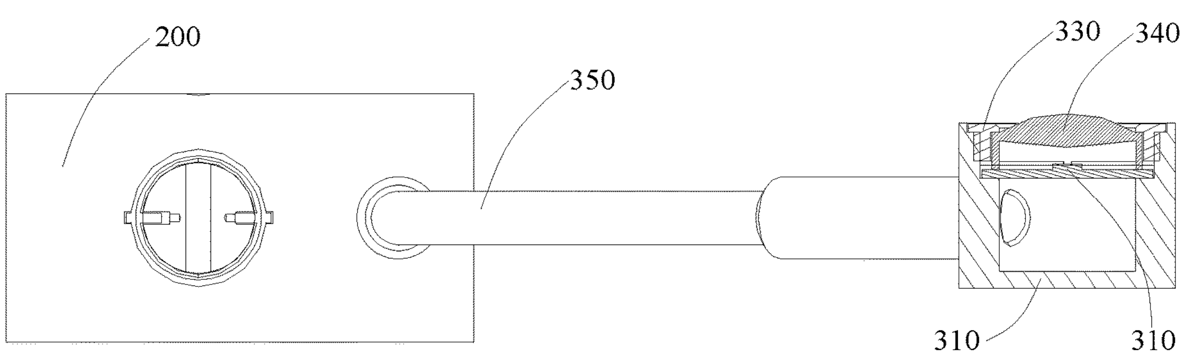
FIG. 6 is a schematic cross-sectional view of a lighting cap assembly in a lighting fixture according to an example of the present disclosure.

The technical solutions according to examples of the present disclosure will be described in detail with reference to the accompanying drawings. As shown in FIGS. 1-6, an example of the present disclosure discloses a lighting fixture, which includes a lighting column 100, a sliding assembly 200, a lighting cap assembly 300 and a base 400. Optionally, the lighting fixture is one of a floor lamp, a desk lamp, a pendant lamp and a wall lamp.

The base 400 can be made of hard materials such as metal or plastic. The base 400 serves as a supporting foundation of the overall lighting fixture. In the process of using the lighting fixture, the lighting fixture can be placed at any position of the ground or wall with the help of the base 400. In the case where the lighting fixture is placed on an installation foundation such as the ground, the lighting fixture can be fixed relative to the installation foundation by means of connecting pieces such as screws; alternatively, the lighting fixture can be moved relative to the installation foundation, which is not limited in the present disclosure. The base 400 is equipped with a driving power supply, which can provide electric energy for a light source 320 of the lighting fixture by connecting the driving power supply with the commercial power, thus ensuring the normal use of the lighting fixture. The driving power supply can be fixedly connected to the base 400 by bonding or screwing, and the base 400 can be provided with a cavity to accommodate the driving power supply, so as to provide protection for the driving power supply by means of the base 400.

The lighting column 100 includes a column body 110 and a conductive track 120, the length of the column body 110 can be determined according to the actual situation, and the column body 110 can be made of hard materials such as plastic or metal, so as to ensure that the column body 110 has the required structural strength and provide reliable support for the lighting cap assembly 300. One end of the column body 110 is installed on the base 400, specifically, the column body 110 can be connected to the base 400 by welding or screwing; alternatively, the lighting column 100 may be installed on the base 400 by a bolt assembly. Furthermore, the base 400 can be provided with a sunk hole and other structures to accommodate the column body 110, so that the column body 110 can extend into the sunk hole, and the connecting reliability between the column body 110 and the base can be ensured.

The column body 110 is provided with a sunk groove 112 extending along a length direction of the column body, and the conductive track 120 is installed in the sunk groove 112. The depth and width of the sunk groove 112 can be determined according to the specific size of the conductive track 120, and the conductive track 120 can be fixed relative to the column body 110 through bonding or clamping, so as to ensure that the electrical connection between the sliding assembly 200 and the conductive track 120 is relatively stable during the use of the lighting fixture. In addition, the conductive track 120 is connected to the driving power supply to electrify the conductive track 120, so that the conductive track 120 is charged and serves as a connecting structure between the lighting cap assembly 300 and the driving power supply.

In addition, the electrical connection usually includes a positive electrode and a negative electrode, and two conductive tracks 120 can be connected to the driving power supply, that is to say, one conductive track 120 is connected to the positive electrode of the driving power supply and the other conductive track 120 is connected to the negative electrode of the driving power supply. Correspondingly, the column body 110 can be correspondingly provided with two sunk grooves 112, two conductive tracks 120 can be correspondingly installed in the two sunk grooves 112, and the two sunk grooves 112 can be arranged side by side on the column body 110 with the same orientation. The orientations of the two sunk grooves 112 can also be different, for example, the orientations of the two sunk grooves 112 have a preset angle therebetween, or the two sunk grooves 112 can be arranged on the column body 110 facing away from each other.

The sliding assembly 200 includes a sliding body 210 and a conductive portion 220. The conductive portion 220 is connected with the sliding body 210, the sliding body 210 can slide along the column body 110, and the conductive portion 220 is electrically connected with the conductive track 120. Optionally, the conductive portion 220 is a hard wire, and in the case where the conductive portion 220 extends into the conductive track 120, the conductive portion 220 can be electrically connected with the conductive track 120 by contacting with the conductive track 120. Alternatively, the conductive portion 220 can be an elastic terminal, and in the case where the sliding body 210 and the column body 110 are matched with each other, the conductive portion 220 and the conductive track 120 are pressed against each other to ensure a more reliable electrical connection between the conductive portion 220 and the conductive track 120.

Specifically, the conductive portion 220 can be in sliding-fit with the conductive track 120 to indirectly ensure that the sliding body 210 can be in sliding-fit with the column body 110. In order to ensure the reliability of the sliding fit between the conductive portion 220 and the conductive track 120, a groove-shaped limiting structure can be formed on a side wall of the conductive track 120, so that the conductive portion 220 can be matched with the groove-shaped limiting structure in a position-limited manner, and the connecting reliability between the conductive portion 220 and the conductive track 120 can be improved.

Alternatively, the sliding body 210 can be directly in a sliding fit with the column body 110. For example, both the sliding body 210 and the column body 110 can be provided with magnetic elements, and the sliding body 210 and the column body 110 can be fixed with relative to each other by a magnetic attraction therebetween. In the case where the position of the sliding assembly 200 needs to be adjusted, the sliding body 210 and the column body 110 can be separated from each other by introducing an external force or the like, and the relative position between the sliding body 210 and the column body 110 can be changed.

The lighting cap assembly 300 includes a housing 310 and a light source 320. The light source 320 is installed in the housing 310, and the housing 310 can provide a certain protective effect for the light source 320. The light source 320 is electrically connected with the conductive portion 220, so that the driving power supply can be connected with the light source 320, supply power to the light source 320, and ensure that the light source 320 can work normally. The housing 310 can be made of plastic and other materials, the housing 310 can be directly connected to the sliding body 210 by bonding, clamping or magnetic connection, etc., and the housing 310 can also be indirectly installed on the sliding body 210 by means of connecting piece with a certain length, etc. Because the sliding body 210 can adjust its position relative to the column body 110, and because the lighting cap assembly 300 is installed on the sliding body 210, the position of the light source 320 will also be changed when the relative position between the sliding body 210 and the column body 110 changes. Users can adjust the position and orientation of the light source 320 according to their own requirements, so that the light source 320 can provide better lighting effects and enhance the user experience.

As described above, both of two sides of the column body 110 facing away from each other can be provided with sunk grooves 112, and the conductive track 120 is installed in each of the sunk grooves 112. With the adoption of the above technical solution, the interval between the two conductive tracks 120 is relatively large; and because the different orientations of the two conductive tracks 120, it is difficult for the two conductive tracks 120 to be conducted with each other in the working process of the lighting fixture, thus improving the safety performance of the lighting fixture. In addition, in the case where the two sunk grooves 112 are respectively arranged on the two sides of the column body 110 facing away from each other, the utilization efficiency of the column body 110 is relatively higher, and the overall size of the column body 110 can be reduced to a certain extent, and the installation space occupied by the lighting fixture can be reduced.

Optionally, a plurality of sliding assemblies 200 and a plurality of lighting cap assemblies 300 can be installed on the lighting column 100, and the plurality of sliding assemblies 200 and the plurality of lighting cap assemblies 300 are connected to each other in one-to-one correspondence, so that the lighting fixture can provide illumination in more directions under the condition that the orientations of the plurality of lighting cap assemblies 300 are different; alternatively, by making the lighting cap assemblies 300 face the same direction, the illumination intensity and illumination uniformity provided by the lighting fixture for the region to which the lighting cap assemblies 300 face can be improved. During the use of the lighting fixture, the number of the sliding assemblies 200 and the lighting cap assemblies 300 installed on the lighting column 100 can be determined according to the actual requirements, and accordingly, parameters such as the orientation of each lighting cap assembly 300 can be determined according to the actual requirements, so as to obtain the required lighting effects.

Further, the lighting column 100 may further include an insulating end cap 130, the insulating end cap 130 is disposed at an end of the column body 110 facing away from the base 400, and an end of the conductive track 120 facing away from the insulating end cap 130 is connected with the driving power supply. Under the action of the insulating end cap 130, the conductive track 120 can be prevented from being exposed at the end of the column body 110 facing away from the base 400, thus improving the overall safety performance of the lighting fixture. In addition, under the condition that the insulating end cap 130 is arranged at the end of the column body 110 facing away from the base 400, the dust-proof and impurity-proof capability of the lighting column 100 can also be improved, the external impurities can be prevented from falling into the conductive track 120 through an open end of the conductive track 120, and the fault probability of the conductive track 120 can be reduced, thus improving the overall performance of the lighting fixture.

Specifically, the insulating end cap 130 can be made of an insulating material such as rubber, and can be a cap-shaped structure and sleeved on the outer periphery of the column body 110 to provide safety protection for the conductive track 120.

In another example of the present disclosure, one of the insulating end cap 130 and the column body 110 is provided with a limiting post 140, and the other is provided with a limiting hole 111, and the limiting post 140 can be inserted into and matched with the limiting hole 111. On the one hand, the limiting post 140 is matched with the limiting hole 111 to provide a predetermined position for the assembling process of the insulating end cap 130 and the column body 110; on the other hand, the position-limiting relationship between the insulating end cover 130 and the column body 110 is more reliable. In addition, the insulating end cap 130 is provided with an installation hole 131, and the insulating end cap 130 is detachably fixed to one end of the column body 110 by a screw 150 passing through the installation hole 131. After the screw 150 and the installation hole 131 are matched with each other, the connecting reliability between the insulating end cap 130 and the column body 110 can be further improved; and under the condition that the limiting post 140 and the limiting hole 111, as well as the screw 150 and the installation hole 131 are matched with each other, a relative rotation between the insulating end cap 130 and the column body 110 can be prevented, and the relative fixing between the insulating end cap 130 and the column body 110 can be further improved.

As mentioned above, the sliding body 210 can be indirectly in a sliding fit with the column body 110 by means of the sliding fit between the conductive portion 220 and the conductive track 120; alternatively, the sliding body 210 can be directly in a sliding fit with the column body 110 by means of magnetic elements or the like.

In another example of the present disclosure, the sliding body 210 can be provided with a through-hole 211, and the sliding body 210 can be sleeved outside the column body 110 through the through-hole 211, so that the sliding body 210 is in sliding fit with the column body 110. During the use of the lighting fixture, the sliding body 210 can slide and rotate relative to the column body 110, so that the position and orientation of the lighting cap assembly 300 can be changed, and the lighting effects of the lighting fixture can meet the use requirements of users. An elastic rubber ring and other components can be arranged between them, so that they can be fixed relative to each other without external force, and the sliding body 210 can slide relative to the column body 110 when an external force is applied.

The conductive portion 220 is disposed in the through-hole 211, which ensures that the conductive portion 220 can be electrically connected with the conductive track 120 disposed on the lighting column 100. In the case where there is a large interaction force between the conductive portion 220 and the conductive track 120, the sliding body 210 can also be fixed relative to the column body 110, without external force, by means of the interaction force between the conductive portion 220 and the conductive track 120, instead of arranging the elastic rubber ring between the sliding body 210 and the column body 110.

More specifically, along the length direction of the column body 110, the conductive portion 220 can be arranged in the middle of the sliding body 210, that is to say, there is a certain distance between the conductive portion 220 and each of the two ends of the sliding body 210 facing away from each other. With the adoption of the technical solution, the conductive portion 220 will not leak current basically when the lighting fixture is in working state, so that the electric shock resulted by the user accidentally touching the conductive portion 220 can be prevented. A safety protection device can be arranged in the lighting fixture to protect the user from being hurt by power failure in case of accidental touch by the user; alternatively, by reducing the voltage value of the driving power supply, the voltage value of the lighting fixture can be within the safe voltage range, thus further improving the safety performance of the lighting fixture.

Based on the above example, the sliding assembly 200 can further include a positioning portion 230, the positioning portion 230 is located in the through-hole 211, and the positioning portion 230 and the conductive portion 220 are distributed along the axial direction of the through-hole 211, and the positioning portion 230 can extend into the conductive track 120.

In the case where the sliding assembly 200 includes the positioning portion 230, when assembling the sliding assembly 200 and the lighting column 100, the positioning portion 230 can be matched with the conductive track 120 in advance to realize the purpose of positioning the conductive portion 220, so as to ensure that the conductive portion 220 can directly extend into the conductive track 120 and can be in positioning fit with the conductive track 120 under the condition that the sliding assembly 200 is sleeved on the lighting column 100, thereby reducing the matching difficulty between the sliding assembly 200 and the lighting column 100 and improving the user experience.

Specifically, both of two sides of the conductive portion 220 facing away from each other can be provided with positioning portions 230, and each of the positioning portions 230 can extend to the edge of the through-hole 211, so that when the sliding assembly 200 and the lighting column 100 are matched with each other, the positioning portions 230 can be directly matched with the conductive track 120, thus further reducing the matching difficulty between the sliding body 210 and the lighting column 100. In addition, under the condition that both of two sides of the column body 110 facing away from each other are provided with sunk grooves 112, the two conductive portions 220 can be oppositely arranged in the through-hole 211; and correspondingly, the two conductive portions 220 can each be provided with a positioning portion 230, which ensures that each conductive portion 220 can be easily matched with the corresponding conductive track 120.

The positioning portion 230 can be made of insulating material such as plastic, so that even if the positioning portion 230 and the conductive track 120 are in contact with each other, the positioning portion 230 will not be charged. More specifically, the positioning portion 230 and the sliding body 210 can be formed by plastic and other materials through integrated injection molding and the like, so as to ensure that the positioning portion 230 and the sliding body 210 have high connecting reliability. In addition, the width of the positioning portion 230 can be slightly smaller than the width of the conductive track 120, so as to reduce the matching difficulty between the positioning portion 230 and the conductive track 120.

Under the condition that the sliding body 210 is sleeved on the column body 110, the sliding body 210 may be further provided with a positioning hole 212, and the sliding assembly 200 further includes a positioning screw, and the sliding body 210 is positioned and matched with the column body 110 through the positioning screw extending into the positioning hole 212. During the use of the lighting fixture, the sliding body 210 can be in sliding fit with the column body 110 by loosening the positioning screw. According to the actual requirements, the sliding body 210 can be adjusted to the required position, and then the sliding body 210 and the column body 110 can be fixed relative to each other by tightening the positioning screw. With the adoption of the technical solution, the stability of the relative fixing between the sliding body 210 and the column body 110 can be further improved, and the situation that the sliding body 210 actively slides or rotates relative to the column body 110 can be prevented during the use of the lighting fixture, which can maintain the stable lighting effects of the lighting fixture, and prevent the sliding body 210 from sliding relative to the column body 110 and bumping against other objects, thus ensuring that the lighting fixture has a longer service life.

Specifically, the sliding body 210 may be provided with at least one positioning hole 212, and in the case of providing a plurality of positioning holes 212, the plurality of positioning holes 212 may be provided with positioning screws in one-to-one correspondence, so as to further improve the stability of the relative fixing between the sliding body 210 and the column body 110. In the case where the number of the positioning holes 212 is plural, each of the two sides of the sliding body 210 facing away from each other can be provided with one positioning hole 212. By arranging the two positioning holes 212 oppositely, the reliability of the fixed connection between the column body 110 and the two oppositely arranged positioning screws can be improved.

Further, the sliding assembly 200 may further include a damping sleeve 240, the damping sleeve 240 is arranged in the through-hole 211 and sleeved outside the column body 110, and the conductive portion 220 is connected with the conductive track 120 after passing through the damping sleeve 240. Under the condition that the damping sleeve 240 is arranged in the through-hole 211, the friction between the sliding body 210 and the column body 110 can be increased, thus preventing the sliding body 210 from rapidly sliding down relative to the column body 110 because of low friction between the sliding body 210 and the column body 110; and the sliding body 210 can be easily positioned at a certain position of the column body 110 under the action of the damping sleeve 240. The damping sleeve 240 can be made of nylon, rubber, foam, etc. The damping sleeve 240 can be fixed in the through-hole 211 by bonding, etc. The thickness of the damping sleeve 240 can be determined according to the actual requirements, but it is not limited here.

Further, the housing 310 can be connected with the sliding body 210 through a soft supporting arm 350, and the housing can move and rotate relative to the sliding body 210 through the soft supporting arm 350, which can further expand the irradiation angle of the light source 320, and further enhance the irradiation range of the light source 320, so that the user can adjust the lighting effects according to the actual requirements, in some cases, only through the soft supporting arm 350; and under the condition that the soft supporting arm 350 cannot achieve the dimming purpose, the lighting effects can be adjusted by the relative sliding between the sliding body 210 and the column body 110, so that the disclosure range of the lighting fixture can be further increased and the user experience can be improved.

Specifically, the soft supporting arm 350 can be made of metal or other materials, and the bending ability of the soft supporting arm 350 made of metal can be ensured by reducing the thickness or diameter of the metal material. In addition, a plastic packaging structure can be arranged outside the metal material, so that the service life of the soft supporting arm 350 can be prolonged, and the user can be prevented from being scratched by the soft supporting arm 350. Alternatively, the soft supporting arm 350 can be a metal hose, and the wire connecting the conductive portion 220 and the light source 320 can penetrate through and be provided in the soft supporting arm 350. The length of the soft supporting arm 350 can be determined according to the actual requirements, and two ends of the soft supporting arm 350 facing away from each other can be respectively installed on the housing 310 and the sliding body 210 by inserting or sleeving.

As mentioned above, the housing 310 can provide some protection for the light source 320. Optionally, the housing 310 can be a hollow and closed structure, and the light source 320 is installed in the housing 310. Alternatively, the lighting cap assembly 300 may further include a gland 330, the housing 310 may be provided with a sunk platform, and the light source 320 may be installed in the sunk platform. The gland 330 is arranged outside the light source 320, and the gland 330 is fixedly connected with the housing 310, so that the light source 320 can be encapsulated in the housing 310. This assembly method is convenient for the replacement and maintenance of the light source 320.

Specifically, the side wall of the sunk platform of the housing 310 can be provided with a limited slot, and the gland 330 can be fixedly connected with the housing 310 by clamping in the limited slot; alternatively, the gland 330 can be fixed on the housing 310 by screws and other components. The part of the gland 330 facing the light source 320 may be provided with a through-hole to ensure that the light emitted by the light source 320 can exit the lighting cap assembly 300; alternatively, the gland 330 may be made of a light-transmitting material, which can also ensure that the light emitted by the light source 320 can pass through the cover 330 and be emitted.

Optionally, the sunk platform is provided with internal threads, and the gland 330 is provided with external threads, and the gland 330 can be fixedly connected with the sunk platform by means of threaded connection, without any other connecting pieces. The connecting process is relatively simple and the connecting relationship is relatively reliable.

Further, the lighting cap assembly 300 further includes a light distribution lens 340, which is disposed between the light source 320 and the gland 330. The light distribution lens 340 can provide gathering and other functions for the light source 320, so as to further improve the lighting effect of the light source 320. In addition, the light distribution lens 340 can also provide a certain protection and isolation function for the light source 320. On the one hand, it can prevent external dust and other impurities from entering the light source 320, and on the other hand, it can prevent users from accidentally touching the light source 320 and getting scalded or electrocuted, thus further improving the service life and safety performance of lighting fixture. Specifically, the light distribution lens 340 can be made of a light-transmitting material such as plastic or glass, and its specific structure can be determined according to the actual situation, which is not limited here.

As mentioned above, the lighting fixture can be placed on the ground or on the wall through the base 400. Optionally, the base 400 includes an installation portion 410 and a supporting rod 420, the installation portion 410 is provided with a jack, and the driving power supply can be installed in the installation portion 410, and the installation portion 410 is configured to be fixed on the installation base. For example, the installation portion 410 can be fixed on the installation base by screws and other components, and the installation base can be the ground or the wall. If the installation base is the wall, a bottom box 430 can be arranged on the wall, and the installation portion 410 can be installed on the bottom box 430 to reduce the wiring difficulty. Optionally, the bottom box 430 can be an 86 bottom box, so as to simplify the installation conditions of the lighting fixture and facilitate the preparation of accessories.

The supporting rod 420 can be fixed on the installation portion 410 through a socket. Specifically, the supporting rod 420 can be a non-circular structure to prevent the supporting rod 420 from rotating relative to the socket and affecting the normal use of the lighting fixture. Alternatively, the supporting rod 420 and the installation portion 410 can be fixedly connected by bonding or the like after the supporting rod 420 is inserted into the socket. Under the condition that the supporting rod 420 and the installation portion 410 are fixed to each other, the lighting column 100 can be installed on the supporting rod 420, and the lighting column 100 can be parallel to a direction of gravity, so as to prevent the supporting rod 420 from rotating relative to the installation portion 410 under large shear force and affecting the normal use of the lighting fixture.

The conductive track 120 in the lighting fixture 100 can be connected with the driving power supply provided in the installation portion 410 through an electrical connector 160. The supporting rod 420 may include a supporting section 421 and a connecting elbow 422 fixed to each other, and the connecting elbow 422 and the supporting section 421 may be perpendicular to each other. The supporting section 421 can be inserted into the installation portion 410, the lighting column 100 can be inserted into the connecting elbow 422 of the supporting rod 420, the electrical connector 160 can be arranged at the bottom of the connecting elbow 422 of the supporting rod 420, and the supporting section 421 can be provided with wires and other components, so that the electrical connector 160 can be connected with the driving power supply, and the connecting elbow 422 can also provide a certain protective effect for the conductive track 120, thereby further improving the safety performance of the lighting fixture.

Furthermore, the installation portion 410 can include a cover 411, an adapter plate 412 and a base body 413, the adapter plate 412 is installed between the cover 411 and the base body 413, and the base body 413 is detachably connected with the cover 411, the cover 411 and the adapter plate 412 are both provided with sockets, so that the supporting rod 420 can be plugged into both of the sockets of the cover 411 and the adapter plate 412. In the case where the adapter plate 412 is provided, the adapter plate 412 can be connected to the driving power supply, and the conductive track 120 can form a reliable electrical connecting relationship with the adapter plate 412 through the electrical connector 160, the wires and other components.

In the case where the installation portion 410 is installed on the wall, the base 400 may further include the bottom box 430, in which the driving power supply may be installed. By connecting the installation portion 410 with the bottom box 430, on the one hand, the lighting fixture can be installed on the wall, and on the other hand, the lighting fixture can be powered from the bottom box 430. The installation portion 410 can be fixed on the bottom box 430 by screws and the like, and the adapter plate 412 and the driving power supply in the bottom box 430 can be electrically connected by binding posts and the like.

The present disclosure discloses a lighting fixture to solve the problem that the position of the existing lighting fixture cannot be adjusted, which is inconvenient for users to use.

In order to solve the problem above, the present disclosure adopts the following technical solution.

The present disclosure provides a lighting fixture, including:

a base, the base is provided with a driving power supply;

a lighting column, the lighting column includes a column body and a conductive track, one end of the column body is installed on the base, the column body is provided with a sunk groove extending along a length direction of the column body, the conductive track is installed in the sunk groove, and the conductive track is electrically connected with the driving power supply;

a sliding assembly, the sliding assembly includes a sliding body and a conductive portion, the conductive portion is connected with the sliding body, the sliding body can slide along the column body, and the conductive portion is electrically connected with the conductive track; and a lighting cap assembly, the lighting cap assembly includes a housing and a light source, the light source is installed in the housing, the housing is connected with the sliding body, and the light source is connected with the conductive portion.

The technical solution adopted by the present disclosure can achieve the following beneficial effects.

In the lighting fixture disclosed by the present disclosure, one end of a column body of a lighting column is installed on a base so as to support the whole lighting fixture through the base; the column body of the lighting column is provided with a conductive track, the conductive track is connected with a driving power supply in the base; a sliding assembly includes a sliding body and a conductive portion, and a lighting cap assembly is electrically connected with the conductive track through the conductive portion, so that a light source can work normally; the lighting cap assembly is connected with the column body through the sliding body, and the sliding body can slide along the column body, so that the lighting cap assembly can adjust its position relative to the lighting column, which is convenient for users to use.

In the above examples of the present disclosure, the emphasis is on the differences among various examples. As long as there is no contradiction, different optimization features among various examples can be combined to form an additional example. Considering the brevity of the text, it will not be repeated here.

The above are only examples of the present disclosure, and are not intended to limit the present disclosure. Various modifications and variations of the present disclosure will be apparent to those skilled in the art. Any modification, equivalent substitution, improvement and the like that are made within the spirit and principle of the present disclosure should be included in the scope of the present disclosure.

What is claimed is:

1. A lighting fixture, comprising:

a base, wherein the base is provided with a driving power supply;

a lighting column, wherein the lighting column comprises a column body and a conductive track, one end of the column body is installed on the base, the column body is provided with one or more sunk grooves extending along a length direction of the column body, two sides of the column body facing away from each other are provided with the one or more sunk grooves, the conductive track is installed in each of the one or more sunk grooves, and the conductive track is electrically connected with the driving power supply;

a sliding assembly, wherein the sliding assembly comprises a sliding body and a conductive portion, the conductive portion is connected with the sliding body, the sliding body can slide along the column body, and the conductive portion is electrically connected with the conductive track; and a lighting cap assembly, wherein the lighting cap assembly comprises a housing and a light source, the light source is installed in the housing, the housing is connected with the sliding body, and the light source is connected with the conductive portion.

2. The lighting fixture according to claim 1, wherein the lighting column further comprises an insulating end cap, the insulating end cap is arranged at an end of the column body facing away from the base, and an end of the conductive track facing away from the insulating end cap is connected with the driving power supply.

3. The lighting fixture according to claim 2, wherein one of the insulating end cap and the column body is provided with a limiting post, and the other is provided with a limiting hole, the limiting post is inserted into and matched with the limiting hole, the insulating end cap is provided with an installation hole, and the insulating end cap is detachably fixed to an end of the column body by a screw passing through the installation hole.

4. The lighting fixture according to claim 1, wherein the sliding body is provided with a through-hole, the sliding body is sleeved outside the column body through the through-hole, and the conductive portion is arranged inside the through-hole.

5. The lighting fixture according to claim 4, wherein the sliding assembly further comprises a positioning portion located in the through-hole, the positioning portion and the conductive portion are distributed along an axial direction of the through-hole, and the positioning portion can be inserted into the conductive track.

6. The lighting fixture according to claim 4, wherein the sliding body is provided with a positioning hole, the sliding assembly further comprises a positioning screw, and the sliding body is matched with the column body in a positioning manner by the positioning screw extending into the positioning hole.

7. The lighting fixture according to claim 4, wherein the sliding assembly further comprises a damping sleeve arranged in the through-hole, the damping sleeve is sleeved outside the column body, and the conductive portion is connected with the conductive track after passing through the damping sleeve.

8. The lighting fixture according to claim 1, wherein the conductive portion is an elastic terminal.

9. The lighting fixture according to claim 1, wherein the housing and the sliding body are connected by a soft supporting arm, and the housing can move and rotate relative to the sliding body through the soft supporting arm.

10. The lighting fixture according to claim 1, wherein the lighting cap assembly further comprises a gland, the housing is provided with a sunk platform, the light source is installed in the sunk platform, the gland is arranged outside the light source, and the gland is fixedly connected with the housing.

11. The lighting fixture according to claim 10, wherein the sunk platform is provided with internal threads, and the gland is connected with the sunk platform in a screwed manner.

12. The lighting fixture according to claim 10, wherein the lighting cap assembly further comprises a light distribution lens, and the light distribution lens is arranged between the light source and the gland.

13. The lighting fixture according to claim 10, wherein the base comprises an installation portion and a supporting rod, the installation portion is provided with a socket, the driving power supply is installed on the installation portion, the installation portion is configured to be fixed on an installation foundation, the lighting column is installed on the supporting rod, and the supporting rod is fixed to the installation portion through the socket.

14. The lighting fixture according to claim 13, wherein the installation portion comprises a cover, an adapter plate and a base body, the adapter plate is installed between the cover and the base body, the base body and the cover are detachably connected, the cover and the adapter plate are both provided with the sockets, the adapter plate is connected with the driving power supply, and the conductive track is electrically connected with the adapter plate.

15. The lighting fixture according to claim 1, wherein a plurality of sliding assemblies and a plurality of lighting cap assemblies are installed on the lighting column, and the plurality of sliding assemblies and the plurality of lighting cap assemblies are connected in one-to-one correspondence.

16. A lighting fixing method, comprising:

providing a base with a driving power supply;

installing a lighting column comprising a column body and a conductive track, by way of installing one end of the column body on the base, providing the column body with one or more sunk grooves extending along a length direction of the column body, providing two sides of the column body facing away from each other with the one or more sunk grooves, installing the conductive track in each of the one or more sunk grooves, and electrically connecting the conductive track with the driving power supply;

assembling a sliding assembly comprising a sliding body and a conductive portion, by way of connecting the conductive portion with the sliding body, enabling the sliding body to slide along the column body, and electrically connecting the conductive portion with the conductive track; and assembling a lighting cap assembly comprising a housing and a light source, by way of installing the light source in the housing, connecting the housing with the sliding body, and connecting the light source with the conductive portion.

17. The lighting fixing method according to claim 16, wherein the installing the lighting column further comprises: arranging an insulating end cap at an end of the column body facing away from the base, and connecting an end of the conductive track facing away from the insulating end cap with the driving power supply.

18. The lighting fixing method according to claim 17, further comprising providing one of the insulating end cap and the column body with a limiting post, and providing the other with a limiting hole, inserting the limiting post into and matching the limiting post with the limiting hole, providing the insulating end cap with an installation hole, and detachably fixing the insulating end cap to an end of the column body by a screw passing through the installation hole.

19. The lighting fixing method according to claim 16, further comprising providing the sliding body with a through-hole, sleeving the sliding body outside the column body through the through-hole, and arranging the conductive portion inside the through-hole.

20. The lighting fixing method according to claim 16, further comprising providing the lighting cap assembly with a gland, providing the housing with a sunk platform, installing the light source in the sunk platform, arranging the gland outside the light source, and fixedly connecting the gland with the housing.

* * * * *